Nov. 20, 1928. 1,692,147
C. ARNOLD
SPARK PRODUCING TOY WITH RACK OPERATED DRIVING MECHANISM
AND CHANGING COLORS
Filed Aug. 1, 1927

Inventor:
Carl Arnold

Patented Nov. 20, 1928.

1,692,147

UNITED STATES PATENT OFFICE.

CARL ARNOLD, OF NUREMBERG, GERMANY.

SPARK-PRODUCING TOY WITH RACK-OPERATED DRIVING MECHANISM AND CHANGING COLORS.

Application filed August 1, 1927, Serial No. 209,882, and in Germany July 8, 1927.

This invention relates to improvements in spark-producing toys with changing pictures as described in my patent application 191,788.

The improvement according to the invention consists in that the spark-producing disk mounted in a casing and having apertures for the passage of sparks, has a smooth top-surface, that the upper end of the vertical shaft on which the spark producing means are mounted, projects from said disk and carries flat rings of colored transparent material which, when the toy is being operated, are made to circulate and continuously alter their circulating movement under the action of the centrifugal force, whereby the pictures lighted in colors change the color rapidly.

An embodiment of the invention is illustrated, by way of example, in the accompanying drawing, in which:—

Figure 1:
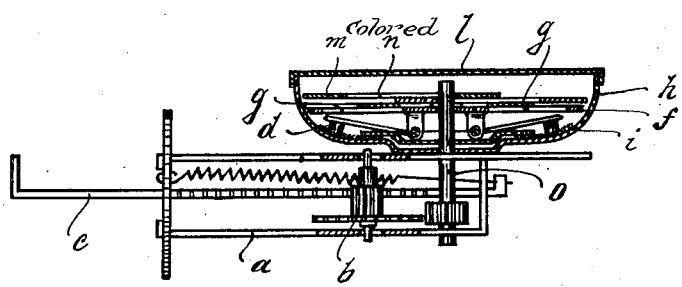
Figure 2:
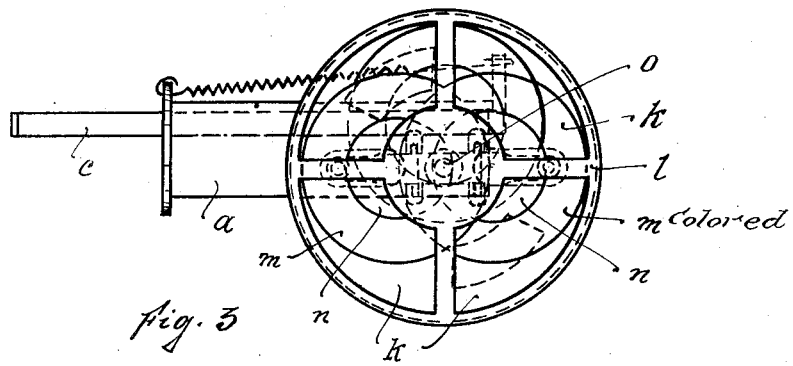
Figure 3:
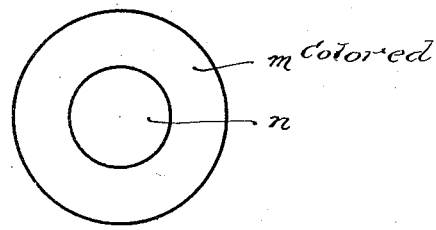

Fig. 1 is a side elevation, partly in section.
Fig. 2 is a top plan view of Fig. 1.
Fig. 3 shows a flat ring of transparent material in top plan view.

The driving mechanism $d$ located in a casing $a$ is actuated by a rack $c$ so that the vertical shaft $o$ is rapidly rotated together with an element of the spark producing device, for instance cerium-stones $d$, fixed on flaps, and with a spark-disk $f$. This spark-disk $f$ has apertures $g$ through which the sparks pass. The cerium-stones slide on an emery-band $i$ arranged in a casing $h$ so that sparks are produced.

The casing is closed by a lid $l$, having windows $k$.

According to the invention the shaft $o$ is extended and over the portion of the shaft $o$ projecting over the spark-disk $f$ flat rings $m$ of transparent material are placed with their central hole $n$.

When the toy is operated, the rings $m$ of transparent material are caused, by the action of the centrifugal force, to circulate around shaft $o$ being at the same time moved in outward direction and pressed against the inner surface of the wall of the casing $h$ so that their movement is braked and changing colored pictures are thus produced which are visible through the lid $l$.

I claim:

A spark-producing toy, comprising in combination with a rack-operated driving mechanism a casing in which said mechanism is located a vertical shaft, rotatably mounted in said casing and projecting through the top plate of said casing, a casing open at the top end, fixed on the top plate of the casing of said driving mechanism, an emery-band on the inner surface of said open casing, cerium-stones connected to said vertical shaft so that they rest on said emery-band, a disk having apertures fixed on said shaft at a certain distance below the top end of the same and having a smooth upper surface, several flat rings of differently colored transparent material placed over the top end of said vertical shaft and resting loosely on said disk, and a lid having windows removably placed on said open casing.

In testimony whereof I affix my signature.

CARL ARNOLD.